United States Patent [19]

Boys

[11] Patent Number: 4,832,133
[45] Date of Patent: May 23, 1989

[54] TIGHTENING SYSTEM AND A METHOD OF TIGHTENING

[75] Inventor: John T. Boys, Birkenhead, New Zealand

[73] Assignee: SPS Technologies, Inc., Newtown, Pa.

[21] Appl. No.: 926,926

[22] Filed: Nov. 3, 1986

[30] Foreign Application Priority Data

Nov. 6, 1985 [NZ] New Zealand .......................... 214090

[51] Int. Cl.⁴ .............................................. B23Q 5/00
[52] U.S. Cl. ...................................... 173/1; 73/862.36; 173/12
[58] Field of Search ................ 173/12, 2, 1; 81/57.11; 73/862.08, 862.36

[56] References Cited

U.S. PATENT DOCUMENTS 4,554,980 11/1985 Doniwa ................................. 173/12

Primary Examiner—Frank T. Yost
Assistant Examiner—Willmon Fridie, Jr.
Attorney, Agent, or Firm—James D. Dee; Aaron Nerenberg

[57] ABSTRACT

A method of tightening and a tightening system using the method. The method includes the steps of providing pulse with modulated waveforms from an inverter, driving an AC induction motor by the waveforms in a highspeed low torque mode or a low speed high torque mode or causing the motor to stop, by controlling the inverter to vary the pulse width of the waveforms, and driving a fastening device by the AC induction motor.

12 Claims, 5 Drawing Sheets

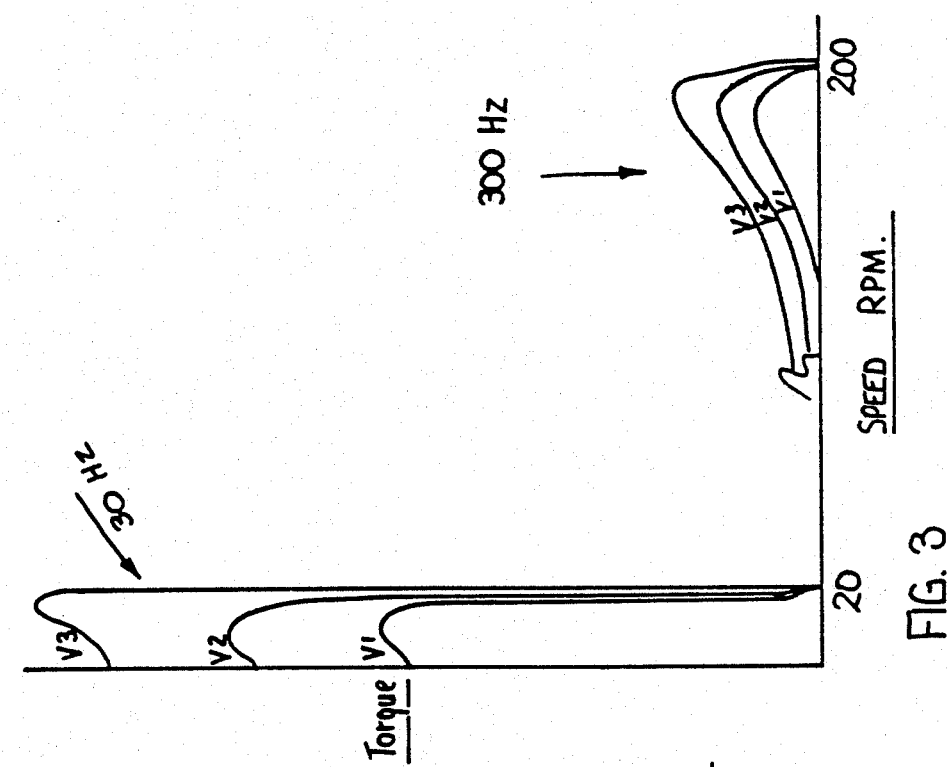
FIG. 3
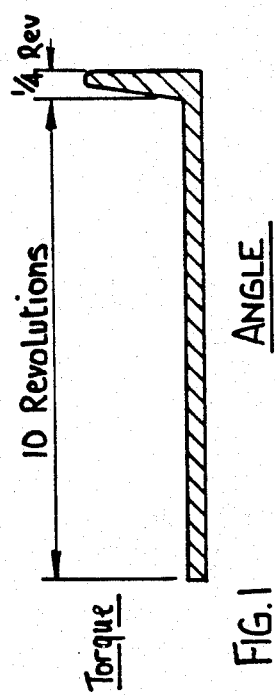
FIG. 1
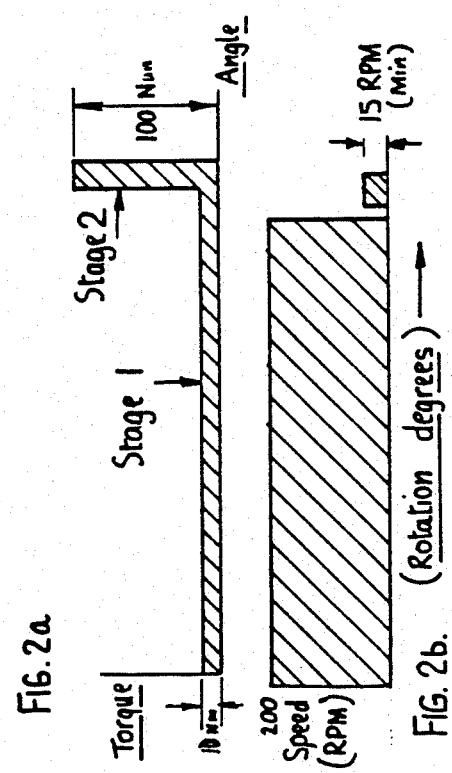
FIG. 2a
FIG. 2b.

Output to Inverter "inhibit"

TIGHTENING SYSTEM AND A METHOD OF TIGHTENING

BACKGROUND OF THE INVENTION

This invention relates to a tightening system and/or a method of tightening.

Threaded fasteners are conventionally tightened on an assembly line using air driven motors supplied from a central compressed air facility. The fastener may be tightened by any of a number of methods including torque control, angle control, tension or yield control, removal of the air supply to the motor, or using a solenoid valve, at the required stopping point. The major advantage of air motors for this application are their low cost, ruggedness, reliability, and safety. The safety feature is particularly important as expanding air in the motor cools the motor and therefore the fire hazard resulting from overheating motors is minimized.

However notwithstanding this major advantage of air driven tools air compressors are both inefficient and expensive to maintain while air motors are even less efficient and compressed air plumbing is likewise expensive to maintain. The overall efficiency of an air motor drive system is typically 3% (from electrical power in to mechanical power out) and higher efficiencies are not possible without higher expansion ratios in the air motors leading to dangerously low motor temperatures which may be hazardous to personnel.

From the control point of view, air motors are also poor as in principle they can really only be turned on or off. Air motor rotors are typically high inertia so that stopping points are often poorly defined and relatively large over-runs are common. In addition the on/off control is usually exercised by solenoid valves which may have 10-30 ms response times leading to larger over-runs still. Reduced speed tightening is in principle possible using flow control valves but in practice it is even less efficient, gives poor control, and so is not used.

In large assembly plants with several hundred air motors low efficiency operation represents a jafor cost item and high efficiency drives are sought after. Both AC and DC electric motors have been used for this purpose by a variety of manufacturers and offer efficiencies of perhaps 65% or more. DC motors are by far the easiest to control and have achieved a measure of success but are unlikely to gain total acceptance as they require regular maintenance of their commutators. In the particular application envisaged here, bolt tightening, the duty cycle may be small but the final tightening inevitably corresponds to a considerable over-rating of the motor. This momentary over-rating is essential to keep the physical size of the motor down so that the inter-spindle spacing can be kept as small as possible. Pulse currents 5 to 10 times full rated current cause greatly reduced brush lives to the point where the motors are unacceptable in high volume production.

A new type of AC motor has begun to gain acceptance in these application that is the brushless DC motor. In essence this motor is an inverted DC motor with an electronic commutator and a permanent magnet rotor. For very high torque and power to size ratios expensive samarium cobalt magnets are often used to give very high field strengths. These magnets cannot be degaussed so that extreme electrical conditions can now be tolerated but the magnets are a ceramic material which must be glued to the rotor and the glue bond is often the weak link. Motor disassembly is a skilled job as the air gaps are small and magnetic keepers must be used to stop the rotor from being attracted to the stator. If it is the force of impact is likely to shatter the magnets—note that motors with Alnico magnets also require keepers but for a different purpose: i.e. to stop the Alnico from being degaussed.

The very high field strengths achieved by the Samarium cobalt magnets means that the back end of the motor (i.e. the terminal voltage self generated when the motor is spinning) is high at high speeds so that high voltage electronic commutators (typically 300 volts) are required. These commutators must be controlled by a form of shaft encoder or resolver to achieve the correct switching sequence in the electronics.

In summary therefore brushless CC motors are expensive, require high voltages, and need a number of angle sense wires between the motor and the electronics. They are therefore potentially hazardous and require highly trained maintenance personnel.

An alternative AC motor, i.e. the induction motor,—has been known of for many years and is conveniently driven from a fixed frequency supply. To minimize the motor size "high-cycle" motors operating at 200 to 300 Hz with appropriate gearing are often used. These motors have high inertia giving poor stopping control, require high hazardous voltages to give full range performance, and under sustained overloads they are a potential fire hazard as they will rapidly overheat.

SUMMARY OF THE INVENTION

It is therefore an object of the present invention to provide a tightening system and/or a method of tightening which will obviate or minimize the foregoing disadvantages or which will at least provide the public with a useful choice.

Accordingly in one aspect the invention consists in a tightening system comprising AC induction motor, fastening means driven by said motor, an inverter to supply pulse width modulated wave forms to drive said motor in one of two modes being:

a high speed low torque mode, or a slow speed high torque mode, or to cause said motor to stop, and control means to cause said inverter to vary the pulse width of said waveforms.

In a further aspect the invention consists in a method of tightening comprising the steps of providing pulse width modulated waveforms from an inverter, driving an AC induction motor by said waveforms in one of two modes comprising (a) a high speed low torque mode, and
(b) a low speed high torque mode, or causing said motor to stop, by controlling said inverter to vary the pulse width of said waveforms, and driving a fastening device by said AC induction motor.

This invention may also broadly be said to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF THE DRAWINGS

One preferred form of the invention will now be described with reference to the accompanying drawings in which, FIG. 1 is a diagrammatic plot of the torque against angle requirements for typical bolt tightening, FIG. 2a is a diagrammatic plot of torque against require rotation for typical tightening, FIG. 2b is a diagrammatic plot of speed (in RPM) against the required rotation in degrees for typical bolt tightening, FIG. 3 is a diagrammatic plot of the characteristics of an induction motor supplied with three constant voltages at two differing frequencies.

DETAILED DESCRIPTION OF THE INVENTION

Figure 4:
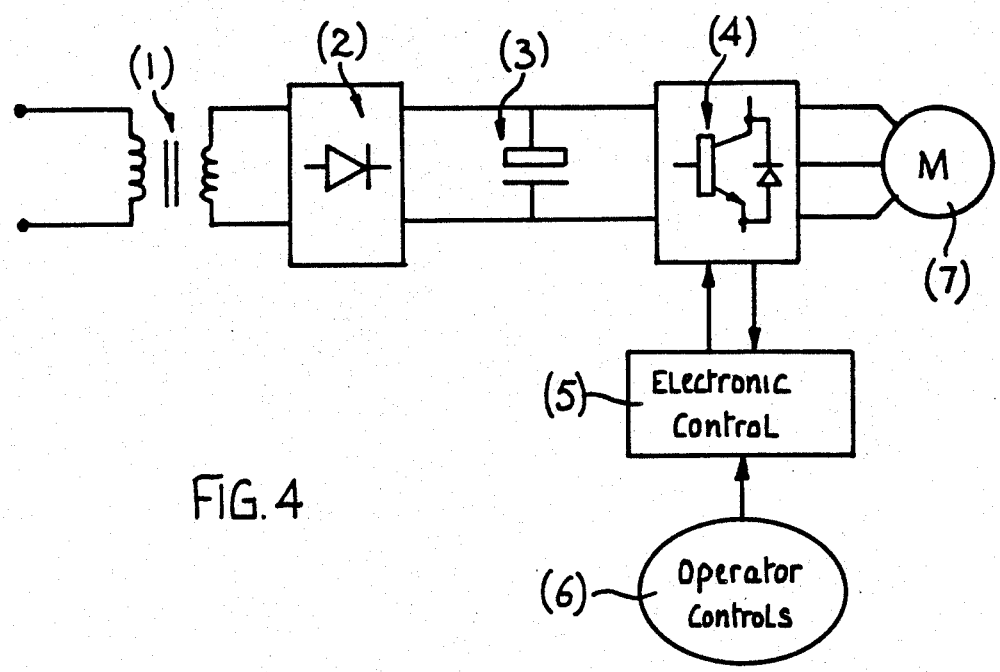
FIG. 4 is a schematic diagram of a pulse-width modulated inverter for use in a tightening system according to one preferred form of the invention.

Referring to the drawings the basis of the invention lies in two experimental observations firstly that induction motors at different frequencies have different speed/torque capability, and secondly that bolt tightening requires certain torque/angle combinations. Thus FIG. 1 shows the basic requirements for tightening bolts showing a typical number of revolutions required for high production rate situations such as car assembly. The graph shows ten revolutions at low torque for winding the nut onto the bolt and one quarter revolution for the final tightening. FIG. 2a shows the torque required in this typical situation against the rotation in degrees. The torque required is initially low, for example, 10 Nm during final tightening. Similarly initial high speed can utilize, for example, 200 RPM during the winding down process with say a minimum of 15 RPM during tightening.

FIG. 3 shows typical characteristics of an A.C. induction motor supplied with three constant voltages at two frequencies, listed in this case as 30 Hz and 300 Hz. It can be seen from FIG. 3 that at 30 Hz high torque is achieved at low speed whilst at 300 Hz high is achieved with low torque.

I have found that when an A.C. induction motor with a rated speed of say 200 RPM × 100 = 20,000 is driven at a selected voltage much below its rated voltage rated torque can be obtained at a much lower frequency. On the basis of this result I recognized that a low voltage low power system could be utilized for bolt tightening economically and with electrical safety. To this end the present invention uses a pulse width modulated (PWM) inverter shown schematically in FIG. 4 comprising a transformer (1) which may be three phase or single phase to supply a low isolated voltage to a diode rectifier (2). The output of rectifier (2) is a DC voltage which is smoothed by capacitor (3) and used to supply a three phase transistor bridge inverter (4). The transistors are switched in a PWM sequence generated by electronic control (5) to drive motor (7) with three phase PWM voltages variable in both magnitude and frequency. The electronic control (5) is itself controlled by operator controls (6) which may be simple on/off controls or more complex depending on the application.

A number of features are desirable to make this conventional PWM inverter suitable for fastener tightening. To reduce the cost of the isolating transformer (1) will conveniently be of relatively small size so that the DC voltage appearing across capacitor (3) will vary in magnitude by typically 50% from one part of the tightening cycle to the next. Inverter (4) converts this DC voltage into three phase PWM waveforms to drive the AC motor. In conventional systems motor protection and inverter protection are achieved by monitoring the motor current, however current transducers for this purpose are expensive. The most common protection strategy is to sense an overcurrent condition, switch the motor off, and switch the inverter off in a "overload trip" condition.

In this application however a better overload strategy is required. The output voltages from inverter (4) should be three phase PWM voltages which switch between the positive and the negative DC bus rails. As the inverter becomes overloaded the transistor on-state voltages will rise so that the PWM voltages will not reach the rails. This condition can be sensed and used to protect the inverter from the overload by switching all the transistors in the PWM inverter off. After some time delay the PWM inverter can be switched back "on" and if the fault still exists it can be promptly switched back off again. By choosing a suitable duty cycle for this "on/off" behavior all the inverter elements can be held within their specified power ratings yet the inverter is ready to start as soon as the fault clears. The protection sensing and control strategy is unique to this inverter and is possible only because of the low DC bus operating voltages.

In the tightening of threaded fasteners the motor (7) is operated in one of two modes. For high speed rundown of the fastener the inverter generates a high frequency output at the maximum possible output voltage—typically 50 volts. Such a low voltage at a high frequency is not sufficient to fully flux the motor but at low torques the high speed is possible—note that the high back end's are not a problem with an induction motor. During the final tightening of the fastener the motor is operated at a low frequency (30–50 Hz). At these lower frequencies there is ample voltage to fully flux or indeed overflux the motor and high torques are possible. At the end of both the high speed and the low speed phases the frequency can be rapidly reduced to zero to give a rapid stop with DC injection. Thermal overload protection for the motor is necessary during the slow speed final tightening operation. Since the final part of the bolt tightening is only a small percentage of the tightening cycle a simple time-out on the low-speed operation gives adequate motor protection. Thus the motor and inverter are protected against continuous overload or short-circuit conditions in a manner which is particularly advantageous for bolt tightening. It is important to note that the stopping method described (selecting zero frequency to inject DC into the motor's rotor) is in fact a particularly severe motor transient that electrically cannot be distinguished from a short-circuit condition—uncontrolled motor currents of 10 to 20 times the motor rated current are possible. The inverter protection method outlined controls these peak current yet allows the DC injection to continue. Conventional protection strategies could not be used for this application.

Figure 5:
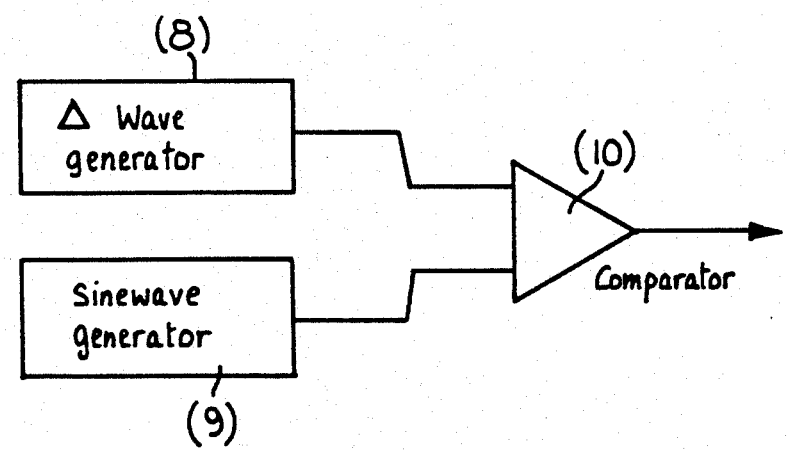
FIG. 5 is a schematic diagram of a control means for use in the tightening means of one preferred form of the invention.
Figure 6:
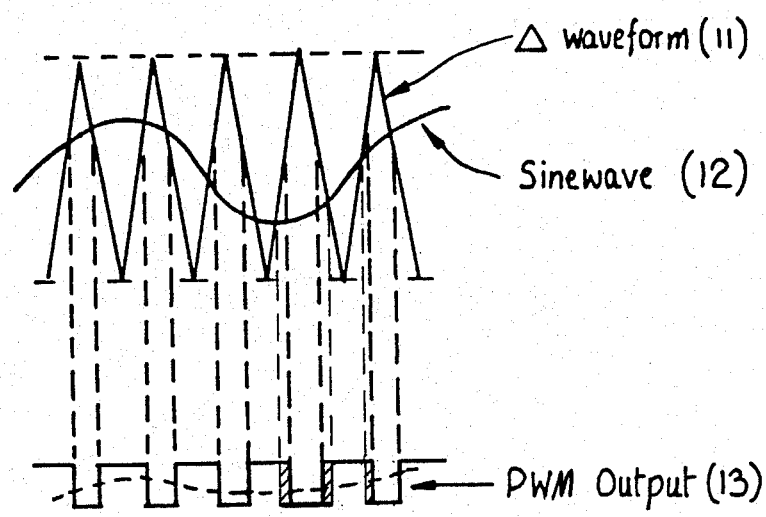
FIG. 6 is a wave diagram showing various outputs of the construction of FIG. 5.

In the generation of PWM waveforms a number of techniques are possible ranging from simple analog methods to very complex modulation strategies demanding microprocessors for their implementation. For the bolt tightening application however full range operation is not required—high torques at high speed are not necessary—so that simple methods can be used without compromise. Usually these simple strategies are avoided especially at high speeds where they can produce sub-harmonic components that increase motor losses and generally impair the motor performance. Here the voltage is reduced so that the sub-harmonics (if any) are consequently much smaller and importantly no performance critical action is required of the motor except that it will rotate with almost negligible torque at high speed—this condition is easily met using the simple triangulation method of PWM generation. In this method shown in FIG. 5 a triangle wave generator (8) and a sinewave generator (9) are used as inputs to comparator (10). The waveforms produced by this method are shown in FIG. 6 where the PWM output signal (13) changes state at the intersection points of triangle wave (11) and sinewave (12). The frequency of the triangle wave determines how rapidly the PWM output waveform changes state; the magnitude and frequency of the sinewave (12) determines the magnitude and frequency of the fundamental component of the PWM waveform (13) and ultimately corresponds to the magnitude and frequency of the motor voltage as will be described.

In this application the magnitude of sinewave (12) is allowed to increase with frequency to the point where it becomes larger than the triangle wave (11) and the PWM is said to progressively saturate. Regardless of the magnitude of the sinewave (12) with saturated PWM the output voltage is limited—in this case it is limited to a value considerably below the rated value for the motor at high frequencies. Variations in the DC bus voltage are unimportant in this case as the motor is underfluxed and no output torque is required.

At low sinewave frequencies the required sinewave magnitude is relatively small. The PWM waveforms produced are effectively multiplied by the magnitude of the DC bus voltage before being applied to the motor and as this bus voltage varies the motor voltage also varies. For tightening a fasteners this is not necessarily bad but to achieve the maximum tightening torque possible it is important to operate at motor currents as high as possible so that variations in the DC bus voltage must be compensated for or the inverter short circuit protection circuitry will modify the waveforms and reduce the available tightening torque.

Figure 7:
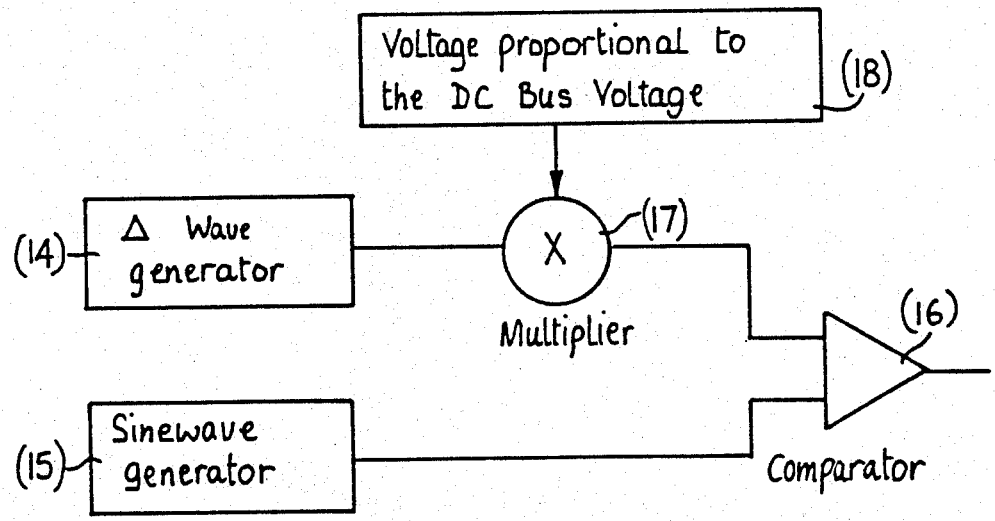
FIG. 7 is a schematic diagram as on FIG. 5 utilizing a compensating circuit.

By noting that the PWM voltages applied to the motor are effectively multiplied by the DC bus voltage a form of compensation would be to multiply the triangle wave voltage by an amount proportional to the DC voltage before comparing it with sinewave (12) in comparator (10). In this way variations in the DC bus voltage would be cancelled out. Circuit to achieve this result is shown in FIG. 7. In this case triangle wave generator (14), sinewave generator (15) and comparator (16) function in the same way as their counterparts (8), (9), and (10) respectively in FIG. 5. A new voltage input (18) proportional to the DC bus voltage is introduced into the circuit using electronic multiplier (17) between the triangle wave generator (14) and comparator (16). Thus if the DC bus voltage doubles the triangle wave voltage will also be doubled and the PWM output will be produced with only half of the modulation depth. But when the voltage is applied to a motor using an inverter switching from the higher bus voltage the motor voltage will be correct.

For a practical induction motor a three phase modulator is required. This is simply obtained using a three phase sinewave generator with one compensation circuit is required.

Figure 8:
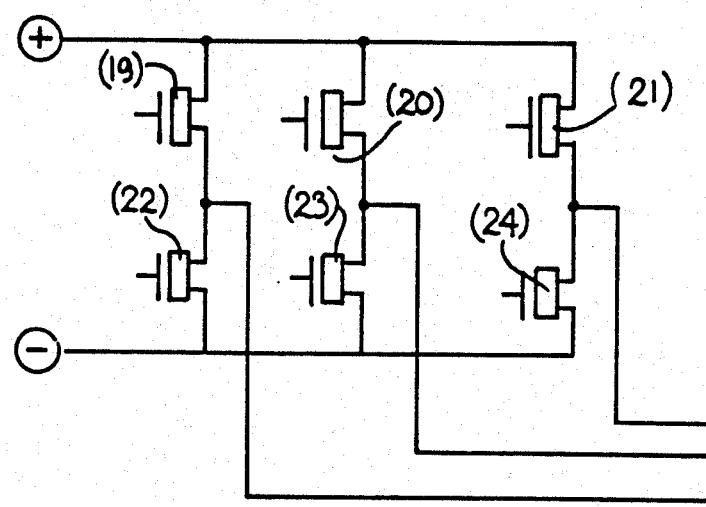
FIG. 8 is a circuit diagram of one form of inverter for use in the tightening system according to one preferred form of the invention.

The three phase PWM voltages produced by the modulator are used to control the switching elements in a three phase inverter shown in FIG. 8. In this application six switching devices (19), (20), (22), (23), and (24) are arranged as a bridge of six. Any switching devices may in principle be used but at the low voltages used here gate controlled devices are preferred and field effect transistors are ideal as they naturally include inverse parallel diodes as part of their circuitry so that as shown in FIG. 8 no diodes are required. With bipolar transistors six extra diodes would be required.

The PWM voltage (13) is used to control a pair of transistors, for example transistors (19) and (22). If the PWM voltage is high transistor (19) is turned on and transistor (20) is turned off; if it is low transistor (20) is turned on and transistor (19) off. With a three phase PWM modulator the other two phases are used to control transistor pairs (20), (23) and (21), (24).

The inverter protection circuit will now be described. Consider on transistor pair (19) and (22). Since at all times either transistor (19) is on or transistor (22) is on the output phase voltage from this pair should always be near the positive voltage rail, or near the negative one, apart from the very short times when it changes from one state to the other. If it is not near these rails then a fault condition is present and the inverter must be protected.

Figure 9:
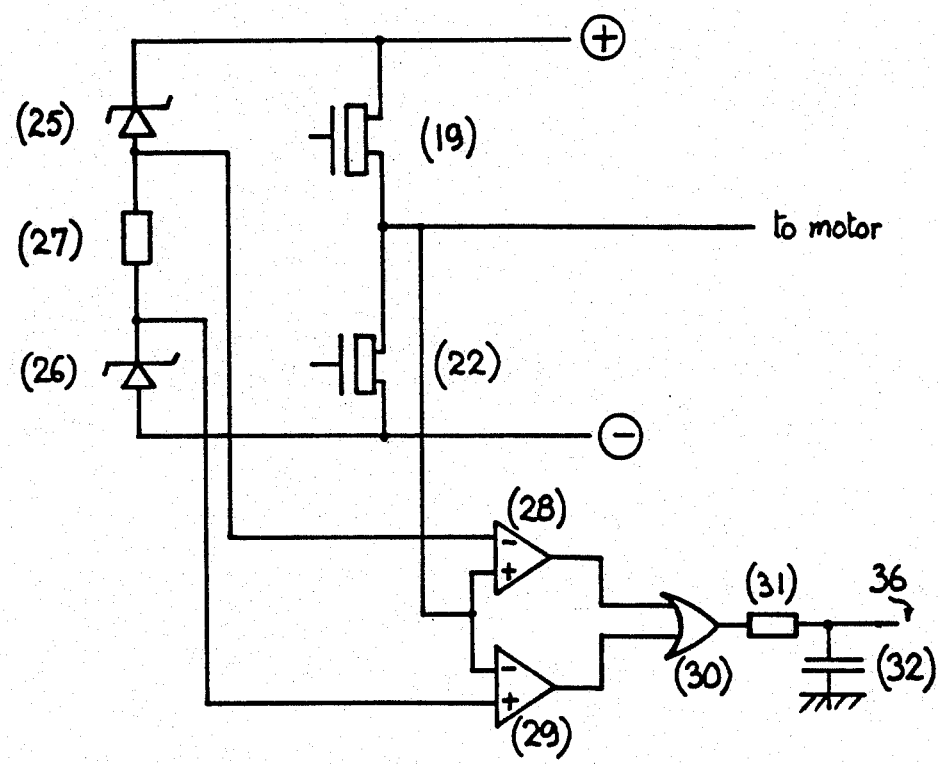
FIG. 9 is a circuit diagram of one pair of switching devices according to the construction of FIG. 9 having the over-load protection circuitry thereof also shown.

The fault detection circuit for transistor pair (19) and (22) is shown in FIG. 9. Zener diodes (25) and (26) with bias resistor (27) are used to give two reference voltages near to the DC bus rails. Thus in the usual mode of operation the output of transistor pair (19) and (22) should always be greater than the high reference voltage at the anode of diode (25) or lower than the low reference voltage at the cathode of diode (26). Thus either the output of comparator (28) or the output of comparator (29) should be high and the output of OR gate 30 should remain high continuously apart from the very short intervals when the PWM output changes state. These short "glitches" may be eliminated by a low pass filter formed of resistor (31) and capacitor (32).

Figure 10:
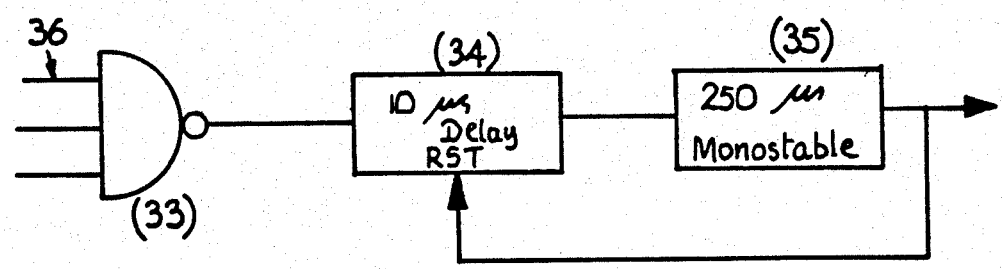
FIG. 10 is a schematic diagram showing utilization of the output of the protection circuitry for the inverter according to one preferred form of tightening system according to the invention and, FIG. 11 is a schematic diagram of a practical tightening system according to one preferred form of the invention.

In a three phase embodiment this circuitry apart from diodes (25) and (26) and resistor (27) are repeated for the other two phases to give three outputs (36) which should all remain continuously high. To implement the protection strategy these three outputs may be combined as shown in FIG. 10. The three outputs are used as inputs to NAND gate (33). If a fault exists one input to gate (33) will go low and the output of gate (33) will go high. The output of gate (33) is the input to a delay circuit (34) giving, say, 10 microseconds delay. If the fault exists for 10 microseconds the output of delay circuit (34) will go high triggering monostable (35). Once triggered monostable multivibrator (35) produces a 250 microseconds pulse which is used to switch off all the transistors in the inverter—a general "inhibit" command—and to reset the 10 microseconds delay circuit (34). After, say, 250 microseconds the inhibit is removed and the inverter is allowed to restart—if the fault still exists monostable (35) will be triggered again in another 10 microseconds. Using these times the inverter will be switched on/off into a fault with a 4% duty cycle. This duty cycle is of course arbitrary but can be chosen to be within the safe operating area of the inverter switches so that no damage is caused on continuous faults—in fact the inverter may run cooler on short circuit than it does on full load.

Field effect transistors are ideal for this application as they are easy to drive and automatically provide the necessary inverse parallel diodes. The on-state voltage drops across them are relatively small but are almost a linear function of the inverter output current. Thus by selecting different Zener diodes (25) and (26) the inverter can be protected at different current levels.

Field effect transistors also current limit at a current closely determined by the gate to source voltage. Thus the protection strategy can be coordinated with transistor driving circuits so that the transistors current limit at a current just slightly higher (say 20%) than the maximum required motor current. The short circuit can then be controlled by selecting the transistor voltage drive levels so that on a fault the transistors current limit at a safe current, their on state voltages rise, and the protection circuit operates.

Field effect transistors are also easily paralleled so that higher currents are easily achieved by adding extra transistors in parallel. Thus this protection strategy is very low cost and is novel but is ideally suited for a bolt tightening cycle where rapid stops are necessary so that instantaneous DC injection is essential. The strategy shown in FIGS. 9 and 10 cannot easily be applied to a high voltage inverter as the voltage differences used by comparators (28) and (29) become relatively smaller and less usable as the DC voltage rises.

Figure 11:
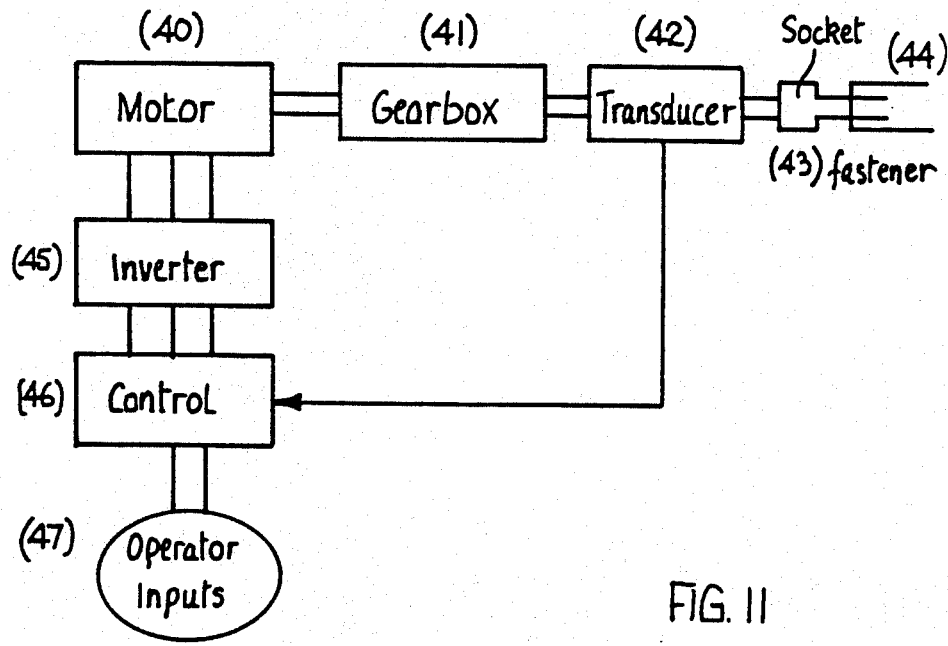

In a practical embodiment of a tightening system using the instant invention shown in FIG. 11 the high frequency AC induction motor (40) is connected to a gearbox (41) which in turn drives socket (43) through transducer (42). The socket(43) is directly connected to the fastener (44) that is being tightened. Transducer (42) allows direct torque and angle measurements to be made so that the fastener tightening may be controlled by any of a number of well known tightening algorithms. The motor (4) is driven by inverter (45) which is controlled by control (46) using operator inputs (47).

In a practical tightening cycle the sequence of operations would be:

1. An initial high speed low torque run down to get the fastener "seated" at some predetermine snug torque measured by transducer (42) and effecting control (46).
2. DC injection into the AC motor at this point to cause a very rapid stop. In practice over-runs of about 10 degrees are achievable. It is important that the overrun should be small.
3. A low frequency high torque mode of operation is selected to tighten the fastener.
4. Tightening is monitored by transducer (42) and control (46).
5. At the desired stopping point DC injection can be used to effect a very rapid stop. Over-runs of much less than 1 degree are easily achieved.
6. The tightening cycle is now complete. If the control algorithm indicates that the fastener joint my be faulty the inverter can be used to generate negative sequence components to undo the fastener in the low speed high torque mode. Techniques for making induction motors run in the reverse direction are well known.

Thus it can be seen that at least in the preferred form of the invention a tightening system and/or a method of tightening are provided which has some advantages. In particular the tightening system and method of tightening allow the use of an AC induction motor to take advantage of its high speed capability whilst yet being able to be provided at a low cost. The invention also allows the use of a low cost transformer which may have poor regulation but without affecting the motor control. This is a particular advantage of the invention that overload protection circuitry is provided which is particularly suited to fastener tightening.

What is claimed is:

1. A tightening system comprising:
   a three phase high frequency AC induction motor;
   fastening means driven by said motor;
   an inverter to supply pulse width modulated wave forms to drive said motor in one of two modes being: a high speed low torque mode, or a slow speed high torque mode, or to cause said motor to stop, said inverter comprising switching means;
   control means to cause said inverter to vary the pulse width of said waveforms, said control means comprising a sinewave generator, a triangular wave generator, and a comparator fed by said sinewave generator and said triangular wave;
   said switching means being fed by said comparator, said switching means comprising three pairs of switching devices arranged as a ridge of six fed by three comparators, one of reach phase, each comparator controlling a pair of switching devices so that a selected one of a said pair of switching devices is switched on while the other switching devices is switched on while the other switching device of said pair is switched off depending upon whether the output from said comparator is high or low, the output of said switches driving said motor; and
   an inverter protection circuit for switching predetermined period if said inverter becomes overloaded, said inverter protection circuit comprising a first and second voltage reference means each providing a reference voltage near DC bus rails for each pair of switching devices, a pair of further comparators each having applied to the input thereof the output voltage of a pair of switching devices and the reference voltage of one of said two reference voltages, said further comparators having the outputs thereof applied to an OR gate the output of said OR gate being high except for overload conditions or when the pulse width modulated output changes state.

2. A tightening system in accordance with claim 1 wherein the outputs of said OR gates are applied to a NAND gate, the output of said NAND gate being utilized to switch said switching devices in said inverter off when the output of said NAND gate is high.

3. A tightening system in accordance with claim 1 wherein a multiplier is included between said regular wave generator and said comparator, said multiplier receiving signals from said triangular wave generator and signals proportional to the DC bus voltage.

4. A tightening system in accordance with claim 1 wherein a transducer is provided to measure the torque and angle of said fastening means, said transducer providing signals representative of such measurements to control means.

5. A tightening system in accordance with claim 1 wherein manually operable members provide further signals to said control means.

6. A tightening system in accordance with claim 4 wherein manually operable members provide further signals to said control means.

7. A method of tightening comprising:
providing pulse width modulated waveforms from an inverter;
driving a three phase high frequency AC induction motor by said waveforms in one of two modes comprising (a) a high speed low torque mode, and (b) a low speed high torque mode, or causing said motor to stop;
controlling said inverter to vary the pulse width of said waveforms by generating a sinewave, generating a triangular wave, comparing said sinewave and triangular wave in a comparator, and utilizing crossovers of said sine-wave and said triangular wave to switch between a high and a low output of said comparator;
driving a fastening device by said AC induction motor;
providing a three phase system and including the steps of providing a comparator for each phase, associating with each comparator a pair of switching devices arranged as a bridge of six, and switching "on" or "off" a selected one of said switching devices depending upon whether said comparator output is high or low and driving said motor from the output of said switching devices; and
protecting said inverter by switching said switching devices off if said inverter becomes overloaded, wherein protecting said inverter comprises providing first and second reference voltages near the DC bus rails for each pair of switching devices, comparing in pairs the output voltage of said pair of switching devices and one of said reference voltages, and applying the pair of outputs thus gained to an OR gate so that the output of said OR gate is high except during an overload condition or as the pulse width modulated output changes state.

8. A method of tightening in accordance with claim 7 wherein the output of said OR gate is applied to the impact of a NAND gate a high output from said NAND gate switching said switching devices in said inverter "off".

9. A method of tightening in accordance with claim 7 wherein said triangular wave is multiplied by a signal proportional to the DC bus voltage before being applied to said comparator.

10. A method of tightening in accordance with claim 7 further comprising measuring the torque and angle of said fastening means, and causing said inverter to be controlled in response to those measurements.

11. A method of tightening in accordance with claim 7 further comprising controlling said inverter in response to signals manually created.

12. A method of tightening in accordance with claim 10 further comprising controlling said inverter in response to signals manually created.

* * * * *